April 2, 1940.   A. E. PAPP ET AL   2,195,630
ELECTRICAL CONNECTION
Filed Aug. 17, 1936
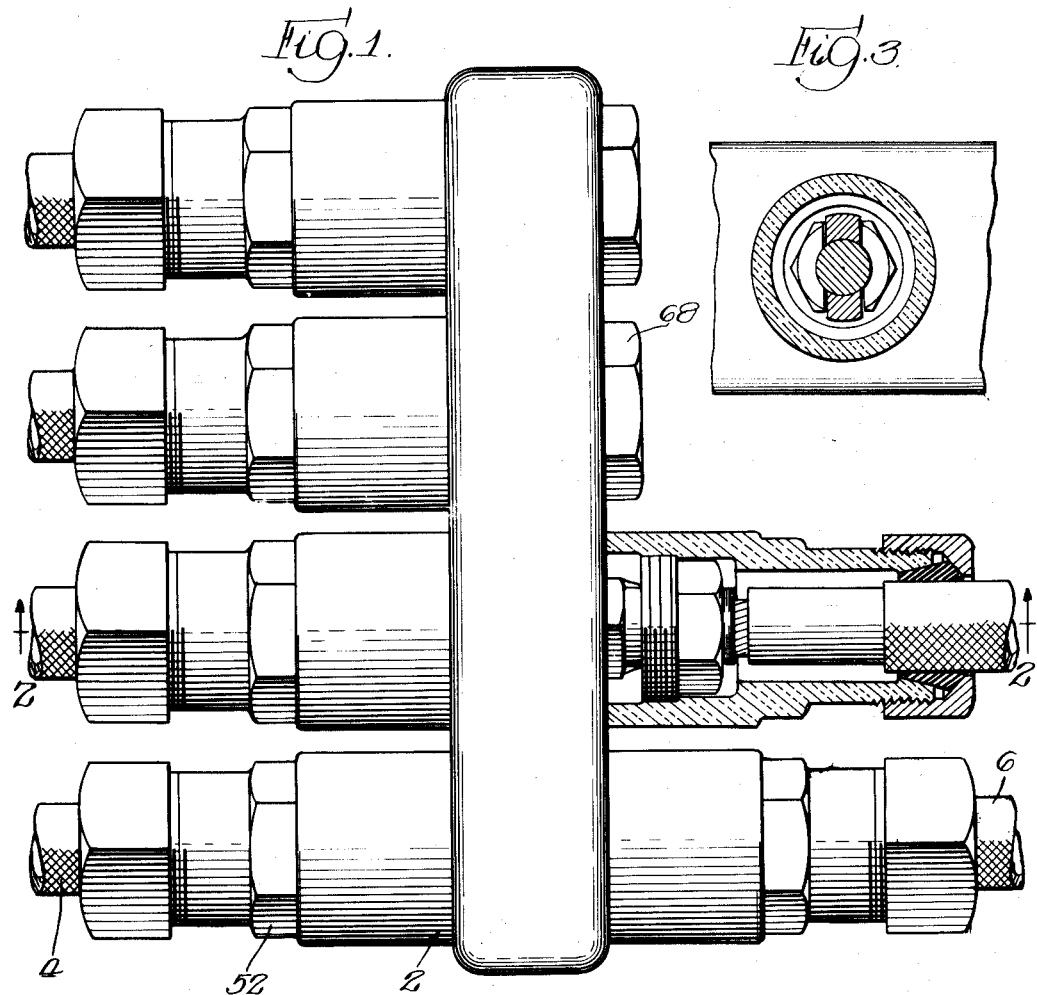
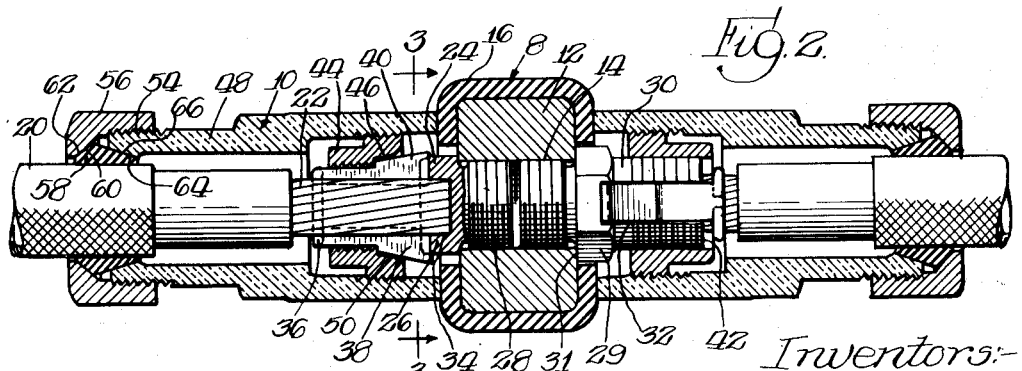
Inventors:-
Andrew E. Papp,
John L. Winks.
By Wilkinson Huxley Byron & Knight Attys.

Patented Apr. 2, 1940

2,195,630

UNITED STATES PATENT OFFICE 2,195,630

ELECTRICAL CONNECTION

Andrew E. Papp and John L. Winks, Chicago, Ill., assignors to G & W Electric Specialty Co., Chicago, Ill., a corporation of Illinois Application August 17, 1936, Serial No. 96,382

7 Claims. (Cl. 174—72)

The present invention relates to electrical devices, and more in particular to novel means for effecting a connection between cables in an underground system of electrical distribution.

Heretofore cables have been connected together or spliced by hand taping in the field. Such a point is unsatisfactory from many standpoints, the principal objections being that the cables are not effectively connected together, the connections are not entirely moisture-proof and are rather cumbersome and difficult to effect in the field.

The present invention therefore has as an object the idea of providing simple and compact means for easily and readily connecting cables together, the same being water-proof throughout, and being readily accomplished in the field.

The present invention comprehends the idea of providing novel means of simple construction for effecting a connection between a plurality of cables in an underground system of distribution, such means being so constructed and arranged that the cables may be easily and readily connected or disconnected.

Another object of the present invention is to provide a novel means for connecting a plurality of cables together in an underground system of distribution wherein the connection between the cables is compact and completely enclosed to provide a water-tight joint between such cables. More particularly, such means is formed with a housing of insulated material completely protecting the connections between the cables.

Still another object of the present invention is to provide a novel connection between a plurality of cables, such connection including as an element a bus bar or connecting member enclosed by a covering of resilient or compressible insulating material. More specifically, the bus bar or connecting member is provided with a covering of rubber molded in situ over said bus bar or connecting member.

The present invention also includes as an object the idea of connecting a plurality of cables to a bus bar or connecting member as described above by means of cable terminals, each end of the cables and the associated cable terminal being suitably enclosed by an insulator drawn into tight engagement with the resilient or compressible covering for the bus bar or connecting member at one end and having a novel joint between its other end and the cable.

Other objects, features, capabilities and advantages are comprehended by the invention, as will later appear and as are inherently possessed thereby.

Referring to the drawing:

Figure 1 is a top plan view of means for connecting a plurality of cables, a part thereof being disclosed in cross-section to show elements of the connecting means more in detail;

Figure 2 is a view in cross-section taken in the plane represented by line 2—2 of Figure 1 of the drawing; and Figure 3 is a fragmentary view in cross-section taken in the plane represented by line 3—3 of Figure 2 of the drawing.

Referring now more in detail to the drawing, a connecting means, generally referred to as 2, is disclosed for connecting together a plurality of cables such as 4 on one side of the connecting means, and cables such as 6 on the opposite side of the connecting means. The connecting means 2 disclosed in the drawing is particularly adapted for use in connecting cables such as 4 and 6 in an undreground system of electrical distribution. The connecting means comprises a connector assembly 8 to which the cables 4 and 6 are connected in alignment by connectors 10 which are of similar construction, and one only of which will be hereinafter referred to.

The connector assembly 8 is formed with a drawn copper bar 12 having a plurality of transversely extending threaded openings 14 therethrough, these threaded openings serving to provide means whereby the connector means 10 are secured to the connector assembly. The bar 12 is insulated and protected by an insulating covering 16 which, in accordance with the present invention, is of rubber of gasket stock and oil and water-resisting and which is molded in situ on the bar 12. It is of course understood that in the molding of the rubber insulating material on the drawn copper bar 12, suitable openings in this insulating covering are provided in alignment with the openings 14 provided in the bar.

The cables to which the connector means 10 are secured are of the sheathed type each having the sheath 20 removed adjacent the end of the cable to expose the cable strands 22. The end of the cable is secured to the bar 12 by means of a cable terminal 24. This cable terminal 24 comprises a cable receiving member 26 which is formed with a threaded stud portion 28 at one end adapted to be threaded in the threaded opening 14 for securing the cable and the connector means to the bus bar or connecting member as by means of applying a tool to the non-circular portion 29 whereby this non-circular portion abuts the face of the bus bar or connecting member adjacent the opening as at 31. This cable receiving member 26 is formed at its other end with a sleeve 30 which is provided with oppositely disposed slots 32. Disposed between the sleeve 30 and the threaded stud portion 28 is provided a recess 34 which is adapted to receive the end of the cable for a purpose to be hereinafter more fully disclosed.

Disposed within the sleeve 32 and mounted upon the end of the cable is a split wedge or clamping member 36 formed with wedge elements 38 and 40 adapted to extend through the slots 32 of the cable receiving member. The sleeve portion 30 is provided with external threads 42 and is adapted to threadedly receive the wedge following member 44 which is provided with an annular wedge element 46 adapted to engage the wedge elements 38 and 40 upon movement of the same with respect to the cable receiving member to force the wedge elements 38 and 40 into gripping engagement with the cable strands. The end of the cable is prevented from becoming frayed or moving outwardly under the clamping action of the wedge elements 38 and 40 by the side walls of the recess 34 which effectively retains the same in place.

In order to protect the cable terminal 24 and the end of the cable, the connector means further includes a housing 48 in the form of a nipple or sleeve which may be of molded Bakelite construction, or any other suitable insulating material, this sleeve threadedly engaging the wedge follower 44 as at 50 whereby the same may be forced into intimate abutting relation with the resilient insulating covering 16 of the bus bar or connecting member by means of applying a tool to the non-circular portion 52.

The outer end of the nipple or sleeve 48 is threaded as at 54 to threadedly receive the gland nut 56 which serves to compress a rubber bushing 58 between the nipple and the sheath 20 of the cable to provide a tight yet flexible joint at the outer extremity of the nipple 48. In order to provide an effective joint, the resilient or compressible rubber bushing is provided with an inclined wedge surface 60 adapted to cooperate with a wedge surface 62 formed on the compression nut 56 and is further provided with wedge surface 64 adapted to cooperate with a similar wedge surface 66 provided on the interior of the sleeve 48 at its outer extremity.

It will be quite apparent from the above description that the cables are effectively connected together by the connector means described, and such connection between the cables is fully protected by the housing formed in part by the non-resilient sleeves 48 of insulating material and in part by the resilient or compressible covering 16 of insulating material. Furthermore, the resiliency of the insulating covering or material 16 provides for a tight joint between the same and the sleeves 48 when the same are forced into place, and a tight joint is provided at the extremity of each of the sleeves 48 and the cables by means of the resilient or compressible bushings 58 which are effectively forced into place to provide the tight joints between the cables and the connector means. Openings in the bus bar or connecting member on either one or both sides thereof which are not used for securing cables to the bar or connecting member may be closed by blank plugs 68 of insulating material if desired, to provide the completed housing referred to hereinbefore.

It will be quite apparent from the above description that the embodiment disclosed herein and which is used for connecting or anchoring cables, provide compact and water-proof means which can be readily assembled and disassembled as desired. Such connector means eliminates the necessity of taping in the field and as has been disclosed, serves to connect cables under varying structural conditions.

While we have herein described and upon the drawing shown an illustrative embodiment of the invention, it is to be understood that the invention is not limited thereto but may comprehend other constructions, arrangements of parts, details and features without departing from the spirit of the invention.

We claim:

1. In an electrical device, the combination of a bus bar, a cable, a cable terminal for connecting said cable to said bar, enclosure means for said bar, means comprising a sleeve embracing the end of said cable and said cable terminal, said enclosure means comprising resilient insulation covering said bar, and said sleeve comprising a non-resilient insulator member embracing said cable terminal and the end of said cable and adjustably connected to said cable terminal whereby the same can be moved into abutting relation with said resilient insulation to provide a water-tight joint therebetween, said insulator having an opening for receiving said cable, and an adjustable gland including a resilient bushing providing a water-tight joint between said cable and insulator.

2. In an electrical device, the combination of a connecting member, a cable, a cable terminal connected to the end of said cable connecting said cable to said connecting member, means comprising compressible insulating material covering said connecting member, and a sleeve embracing the end of said cable adjustably mounted longitudinally with respect to said cable and abutting said insulating material covering said connecting member to compress the same to provide a tight joint between said connecting member and sleeve.

3. In an electrical device, the combination of a connecting member, a cable, a cable terminal connected to the end of said cable connecting said cable to said connecting member, means comprising compressible insulating material covering said connecting member, and a sleeve of insulating material embracing the end of said cable adjustably mounted longitudinally with respect to said cable and abutting said insulating material covering said connecting member to compress the same to provide a tight joint between said connecting member and sleeve.

4. In an electrical device, the combination of a bus bar, a cable, a cable terminal connected to the end of said cable for connecting said cable to said bar, enclosure means for said bar, means comprising a sleeve embracing the end of said cable and said cable terminal, said enclosure means comprising resilient insulation covering said bar, and said sleeve comprising a non-resilient insulator member being adjustably connected to said cable terminal whereby the same can be moved into abutting relation with said resilient insulation to provide a weather tight joint therebetween.

5. In an electrical device, the combination of a connecting member, a cable, a cable terminal connected to the end of said cable connecting said cable to said connecting member, means comprising compressible insulating material covering said connecting member, a sleeve of insulating material embracing the end of said cable adjustably mounted longitudinally with respect to said cable and abutting said insulating material covering said connecting member to compress the same to provide a tight joint between said connecting member and sleeve, and closure means adjacent the other end of said sleeve to provide a tight joint between the same and said cable.

6. In an electrical device, the combination of a connecting member, a cable, a cable terminal connected to the end of said cable connecting said cable to said connecting member, compressible insulating material molded in situ and covering said connecting member, and a sleeve of insulating material embracing the end of said cable adjustably mounted longitudinally with respect to said cable and abutting said insulating material covering said connecting member to compress the same to provide a tight joint between said connecting member and sleeve.

7. An electrical device comprising in combination, a bus bar having a plurality of cable terminal attaching means compressible insulating material covering said bus bar and having openings adjacent said attaching means, separable insulating members for said openings and adapted to be movably mounted with respect to and abutting said covering of compressible insulating material to compress the same to provide a tight joint, any of said members being adapted to be removed for connecting a cable to said bus bar, said cable having a cable terminal connectible to said attaching means, a sleeve of insulating material embracing the end of said cable adjustably mounted longitudinally with respect to said cable and abutting said insulating material covering said bus bar to compress the same to provide a tight joint between said bus bar and sleeve, and closure means adjacent the other end of said sleeve to provide a tight joint between the same and said cable.

ANDREW E. PAPP.
JOHN L. WINKS.